Aug. 12, 1952    J. S. BENCICH    2,606,651
PROTECTIVE CONTAINER FOR PIES AND CAKES
Filed March 29, 1948
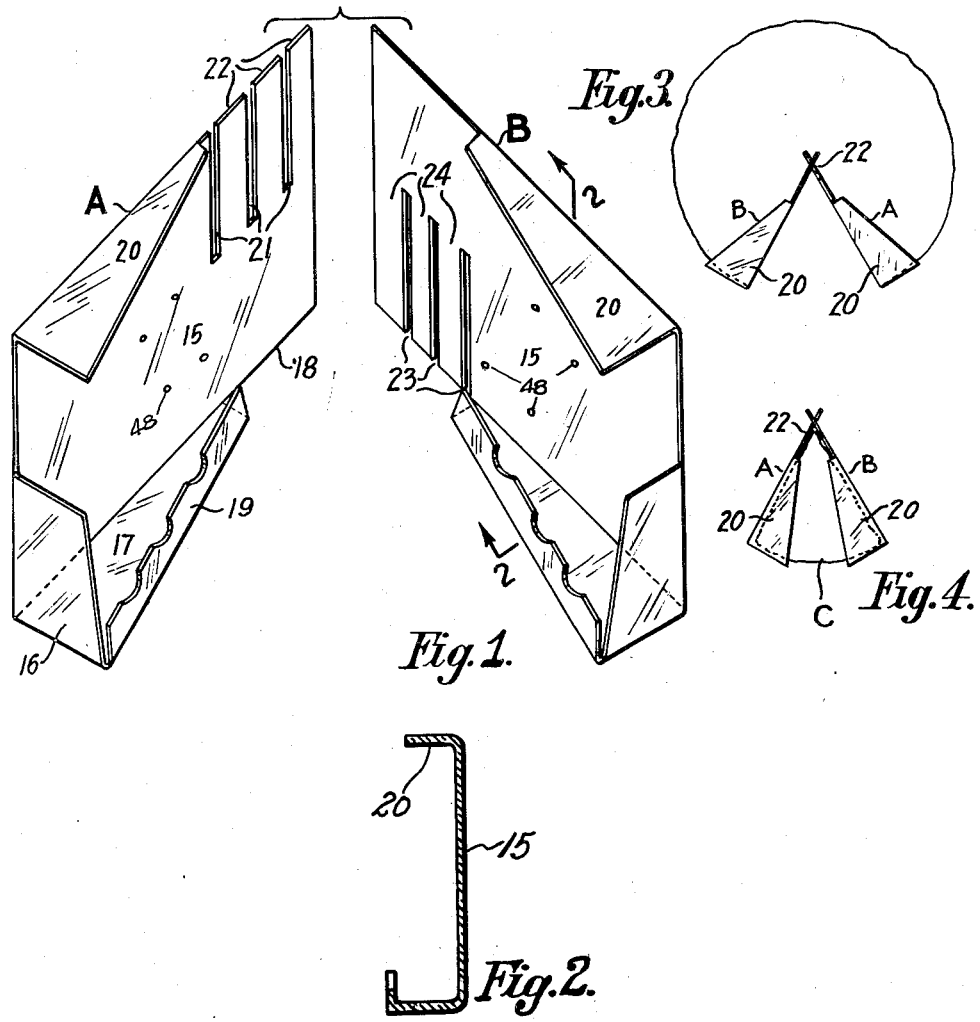
INVENTOR.
John S. Bencich
BY Edward C. Healy
ATTORNEY Patented Aug. 12, 1952

2,606,651

UNITED STATES PATENT OFFICE 2,606,651

PROTECTIVE CONTAINER FOR PIES AND CAKES

John S. Bencich, San Francisco, Calif.

Application March 29, 1948, Serial No. 17,793

1 Claim. (Cl. 206—4)

This invention relates to improvements in containers and has particular reference to a portable, adjustable container capable of retaining therein a segment of a pie or of a cake.

The principal object of my invention is to provide a container for this purpose so shaped and constructed that not only is the pie or the cake protected from crushing or damaging engagement with other objects but is also prevented from collapsing or losing its shape, as it sometimes does due to the usual soft or fragile character and peculiar shape of a pie or cake segment.

My improved container has been evolved in view of the very obvious need for some means to enable a piece of pie or cake to be packed in a lunch box or basket, such as is carried by countless workers, without danger of the delicate pie or cake being crushed by the other articles in the box, and so that the pie or cake will be able to withstand the jolting or vibration incident to transportation of the box without danger of collapse or disintegration. The container for the above purpose would preferably be constructed so as to be of a permanent character capable of being used any number of times. The container however is also adaptable for use by those restaurants or caterers which put up lunches to be taken out by the purchasers and eaten elsewhere.

In the first instance the container would preferably be made of a plastic sheet, whereas for the second use mentioned pressed paper pulp, cardboard, or some similar relatively cheap material, adapted to be discarded after use, would be employed.

A further object of the invention is the employment of a container that is made of substantially complemental sections that, by the provision of unique locking means, can be detachably secured together and which will function to hold pie and cake segments of varying dimensions.

An additional object of the invention is the provision of means in the base and back of the sections that are capable of being embedded in portions of the food products, that will serve to retain the pie or cake in a fixed position within the container, without danger of accidental displacement of the segments from the container.

An additional object of the invention is the provision of means whereby the sections can be reversed and adjusted, in one form of the invention, to provide a medium for protecting the cake, after one or more pieces have been sliced from the body of the cake.

A further object of the invention is the production of a simple and inexpensive device that is exceedingly effective and serviceable in use for the purpose for which it is designed.

Other objects and advantages will be apparent during the course of the following description.

In the accompanying drawing wherein for the purpose of illustration is shown the various forms of my invention, Fig. 1 is a perspective view of the two sections of my inproved container, Fig. 2 is a vertical section through one of the container sections, the view being taken on the line 2—2 of Fig. 1, Fig. 3 is a top plan view, on a reduced scale, of the two sections joined and reversed from the disclosure of Fig. 1, and illustrating the use and position of the container when the device is inserted in a cut portion of a cake from which a segment of cake has been removed, Fig. 4 is a top plan view on a reduced scale of the locked sections with a segment of cake positioned in the container.

Referring to the drawings, in Figs. 1, 2, 3, and 4 I have illustrated the container and the pair of sections utilized for holding a segment of cake With the exception of the formation and position of the interlocking ribs of the two sections A and B, each being made of transparent plastic material, the said sections are of similar construction, and accordingly but one will be described. The section A embodies in its construction a vertical side wall 15 and a reduced or short rear wall 16, formed at right angles to said side wall. From the bottom of the side wall and from the bottom of the rear wall there extends a substantially triangular base 17, the apex thereof terminating short of the bottom edge 18 of the side wall. A corrugated or notched vertical ledge 19 is formed by bending the base upwardly and at right angles thereto, and thus providing a retainer element capable of being embedded in the base of the cake segment C to prevent displacement of the same, when the container sections A and B are locked together, as illustrated in Fig. 4.

A triangular-shaped top flange 20, integrally formed with the side wall 15 and bent at substantially right angles thereto, serves as a partial cover for the cake segment and prevents dislodgment of the latter when the segment is positioned in the completed container.

It will be noted that the front top portion of the side wall 15 is slotted as at 21 to provide a plurality of spaced tongues 22, the purpose of which will be hereinafter explained.

Referring to the section B, it corresponds in every respect to the construction of the section A, with the exception that its side wall 15 is slotted as at 23 to provide spaced tongues 24 at the front bottom portion thereof. Accordingly, by the provision of the respective tongues in the sections A and B, a locking means is provided for detachably securing the said sections one to the other, as disclosed to advantage in Fig. 4 and wherein the completed container is shown.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

I claim:

A container for a food product of segment form comprising a pair of sections defining a housing for the product, each section including a side wall, a base, a rear wall and a cover for a portion of the food product, means formed in the side wall of one section engageable with means formed in the side wall of the other section to detachably secure the sections one to the other, said means comprising interlocking tongues, and means provided in the base of each section capable of engaging the food product to prevent accidental displacement of the latter from the container, said means comprising an elongated ledge extending upwardly from the base of each section.

JOHN S. BENCICH.

REFERENCES CITED

The following references are of record in the file of this patent:

UNITED STATES PATENTS

| Number | Name | Date |
| --- | --- | --- |
| 342,834 | Mueller | June 1, 1886 |
| 1,848,120 | Fisher | Mar. 8, 1932 |
| 1,912,329 | Wassell | May 30, 1933 |
| 2,006,811 | Mersbach | July 2, 1935 |
| 2,388,442 | Reyburn | Nov. 6, 1945 |